(12) United States Patent
Brooks et al.

(10) Patent No.: US 10,283,114 B2
(45) Date of Patent: May 7, 2019

(54) SOUND CONDITIONING

(71) Applicant: Hewlett-Packard Development Company, L.P., Houston, TX (US)

(72) Inventors: Robert C Brooks, Houston, TX (US); Kent E Biggs, Tomball, TX (US); Chi So, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/514,640

(22) PCT Filed: Sep. 30, 2014

(86) PCT No.: PCT/US2014/058402
§ 371 (c)(1),
(2) Date: Mar. 27, 2017

(87) PCT Pub. No.: WO2016/053316
PCT Pub. Date: Apr. 7, 2016

(65) Prior Publication Data
US 2017/0249939 A1    Aug. 31, 2017

(51) Int. Cl.
*H04M 1/60* (2006.01)
*H04R 1/40* (2006.01)
(Continued)

(52) U.S. Cl.
CPC .............. *G10L 15/20* (2013.01); *G10L 15/22* (2013.01); *G10L 15/24* (2013.01);
(Continued)

(58) Field of Classification Search
None
See application file for complete search history.

(56) References Cited

U.S. PATENT DOCUMENTS

| 5,490,219 A | 2/1996 | Badie et al. |
| 7,171,004 B2 * | 1/2007 | Michaelis ............... H04M 9/08 379/388.02 |

(Continued)

FOREIGN PATENT DOCUMENTS

| CN | 102572369 | 7/2012 |
| CN | 103260098 | 8/2013 |

OTHER PUBLICATIONS

Herre et al., "Acoustic Echo Cancellation for Surround Sound Using Perceptually Motivated Convergence Enhancement," ICASSP 2007, Apr. 2007, pp. I-17 to I-20, IEEE.

*Primary Examiner* — Fariba Sirjani
(74) *Attorney, Agent, or Firm* — HP Inc. Patent Department (57) ABSTRACT

Example implementations disclosed herein can be used to generate a local sound signal corresponding to utterances of a user and other sounds detected by a microphone array coupled to a communication device and to condition the local sound signals to separate the utterances of the user from the other sounds to generate a conditioned sound signal. The conditioned sound signals are evaluated to generate a local quality score for the conditioned sound signals, and when the local quality score of the conditioned sound signals is below a threshold associated with the communication device, a local feedback message indicating a local user position change can be generated. The local feedback message can include instructions for the user to move to another location to improve the quality of the condition sound signals.

20 Claims, 6 Drawing Sheets

(51) Int. Cl.
  *H04R 3/00*  (2006.01)
  *G10L 15/20*  (2006.01)
  *G10L 15/22*  (2006.01)
  *G10L 15/24*  (2013.01)
  *G10L 25/60*  (2013.01)
  *H04R 27/00*  (2006.01)
  *G10L 21/0208*  (2013.01)
  *G10L 21/0216*  (2013.01)
  *G10L 21/0232*  (2013.01)

(52) U.S. Cl.
  CPC ...... *G10L 21/0208* (2013.01); *G10L 21/0232* (2013.01); *G10L 25/60* (2013.01); *H04M 1/6008* (2013.01); *H04R 1/406* (2013.01); *H04R 3/005* (2013.01); *G10L 2021/02082* (2013.01); *G10L 2021/02166* (2013.01); *H04R 27/00* (2013.01); *H04R 2227/003* (2013.01)

(56) References Cited

U.S. PATENT DOCUMENTS

| | | | | |
|---|---|---|---|---|
| 7,720,212 | B1* | 5/2010 | Jouppi | H04M 3/56 370/351 |
| 8,949,905 | B1* | 2/2015 | Truitner | H04N 21/2542 709/219 |
| 9,135,915 | B1* | 9/2015 | Johnson | G10L 15/26 |
| 9,605,971 | B2* | 3/2017 | Niehsen | B62D 15/025 |
| 9,685,171 | B1* | 6/2017 | Yang | G10L 21/0208 |
| 9,723,260 | B2* | 8/2017 | Feng | G06K 9/00228 |
| 9,779,758 | B2* | 10/2017 | Johnson | G10L 15/26 |
| 9,846,915 | B2* | 12/2017 | Howe | G06Q 40/08 |
| 9,847,082 | B2* | 12/2017 | Mohideen | G10L 15/20 |
| 9,902,425 | B2* | 2/2018 | Singh | B60T 8/1708 |
| 2003/0118200 | A1 | 6/2003 | Beaucoup et al. | |
| 2006/0143017 | A1* | 6/2006 | Sonoura | G10L 15/26 704/275 |
| 2006/0239471 | A1 | 10/2006 | Mao et al. | |
| 2007/0025562 | A1* | 2/2007 | Zalewski | H04R 3/005 381/92 |
| 2007/0263081 | A1* | 11/2007 | De Beer | H04N 7/142 348/14.08 |
| 2008/0304677 | A1* | 12/2008 | Abolfathi | G10K 11/178 381/71.1 |
| 2010/0201525 | A1* | 8/2010 | Bahat | A01M 29/10 340/573.2 |
| 2010/0277411 | A1* | 11/2010 | Yee | G06F 3/017 345/156 |
| 2011/0096137 | A1 | 4/2011 | Baker et al. | |
| 2011/0193933 | A1* | 8/2011 | Ryu | H04N 7/142 348/14.08 |
| 2012/0134507 | A1* | 5/2012 | Dimitriadis | H04R 3/00 381/92 |
| 2012/0182429 | A1* | 7/2012 | Forutanpour | H04R 3/005 348/175 |
| 2012/0316876 | A1* | 12/2012 | Jang | G06F 3/167 704/246 |
| 2013/0218575 | A1 | 8/2013 | Konishi et al. | |
| 2013/0223660 | A1* | 8/2013 | Olafsson | H04R 25/407 381/313 |
| 2013/0301837 | A1* | 11/2013 | Kim | H04N 7/15 381/56 |
| 2014/0003635 | A1 | 1/2014 | Mohammad et al. | |
| 2014/0093091 | A1 | 4/2014 | Dusan et al. | |
| 2014/0207452 | A1* | 7/2014 | Klein | G06F 3/0304 704/235 |
| 2014/0219472 | A1* | 8/2014 | Huang | H04R 1/406 381/92 |
| 2014/0253326 | A1* | 9/2014 | Cho | G08B 25/10 340/539.13 |
| 2014/0270188 | A1 | 9/2014 | Hall et al. | |
| 2014/0324271 | A1* | 10/2014 | Oh | G05B 15/00 701/28 |
| 2015/0058003 | A1* | 2/2015 | Mohideen | G10L 15/20 704/233 |
| 2017/0090865 | A1* | 3/2017 | Armstrong-Muntner | H04R 29/001 |
| 2017/0215005 | A1* | 7/2017 | Hsu | H04R 3/005 |

* cited by examiner

SOUND CONDITIONING

BACKGROUND

Various techniques exist for conditioning the sound detected by communication devices for separating the voice of a user from the ambient or background noise to improve the efficacy of remote voice communication. Sound conditioning, such as echo cancellation and noise cancellation, can significantly increase the intelligibility of a speaker's voice by removing distracting audio artifacts from the sound signal.

DETAILED DESCRIPTION

Various example implementations described herein include techniques for systems, devices, and methods for optimizing sound conditioning in communication devices. The sound conditioning can include various types of digital or analog filters and sound processing operations, such as noise cancellation, echo cancellation, and the like.

Sound conditioning is often implemented with a particular microphone array or operating environment in mind. Accordingly, because a particular microphone array may have specific set of operating characteristics in a particular operating environment, the corresponding sound processing operations may be specific to those operating characteristics. For example, a microphone array may be operated in a particular mode to have a region of optimal sensitivity. When operated in that mode, the microphone array will be most sensitive to sounds originating from the region that may be specifically located relative to the microphone array (e.g., the region may be configured to include the position of an intended user in a conference room). Sound processing for the microphone array can thus be optimized for situations in which the microphone is operated in a particular mode. Accordingly, the sound conditioning for a microphone array operated in a mode to detect a user speaking at a specific indoor podium will most likely be different than the sound conditioning for the microphone array operated to detect multiple users disposed in different locations in a conference room.

The regions of optimal sensitivity will be different when the microphone array is operated for different scenarios (e.g., different modes of operation). Accordingly, the sound conditioning applied for one region of optimal sensitivity will be different than the sound conditioning for another region of optimal sensitivity. In addition, the sound conditioning may be more or less effective for sounds originating from various parts of the region of optimal sensitivity of the microphone array. As users move from or around in the respective regions of optimal sensitivity, the efficacy of the applied sound processing may degrade or be sub-optimal. Example implementations of the present disclosure can evaluate the quality of the sound conditioning to infer corrections to the user position to improve or maintain an acceptable quality of the conditioned sound, thus improving the clarity with which the desired sounds (e.g., the voice of a user) can be discerned when transmitted to a remote device.

In some examples, necessary user position changes can be communicated to the users through various audio and visual directional indicators that can guide the user back into the optimal sound conditioning region associated with a particular mode of operation and/or operating characteristics and conditions of the microphone array. Accordingly, during a communication session, such as a teleconference, a user may be guided to a particular location relative to the microphone array so that noise and/or echo cancellation operations produce an optimal sound quality for the remote listeners.

In the following detailed description of the present disclosure, reference is made to the accompanying drawings that form a part hereof, and in which is shown by way of illustration how examples of the disclosure can be practiced. These examples are described in sufficient detail to enable those of ordinary skill in the art to practice the examples of this disclosure, and it is to be understood that other examples can be utilized and that process, electrical, and/or structural changes can be made without departing from the scope of the present disclosure.

Figure 1:
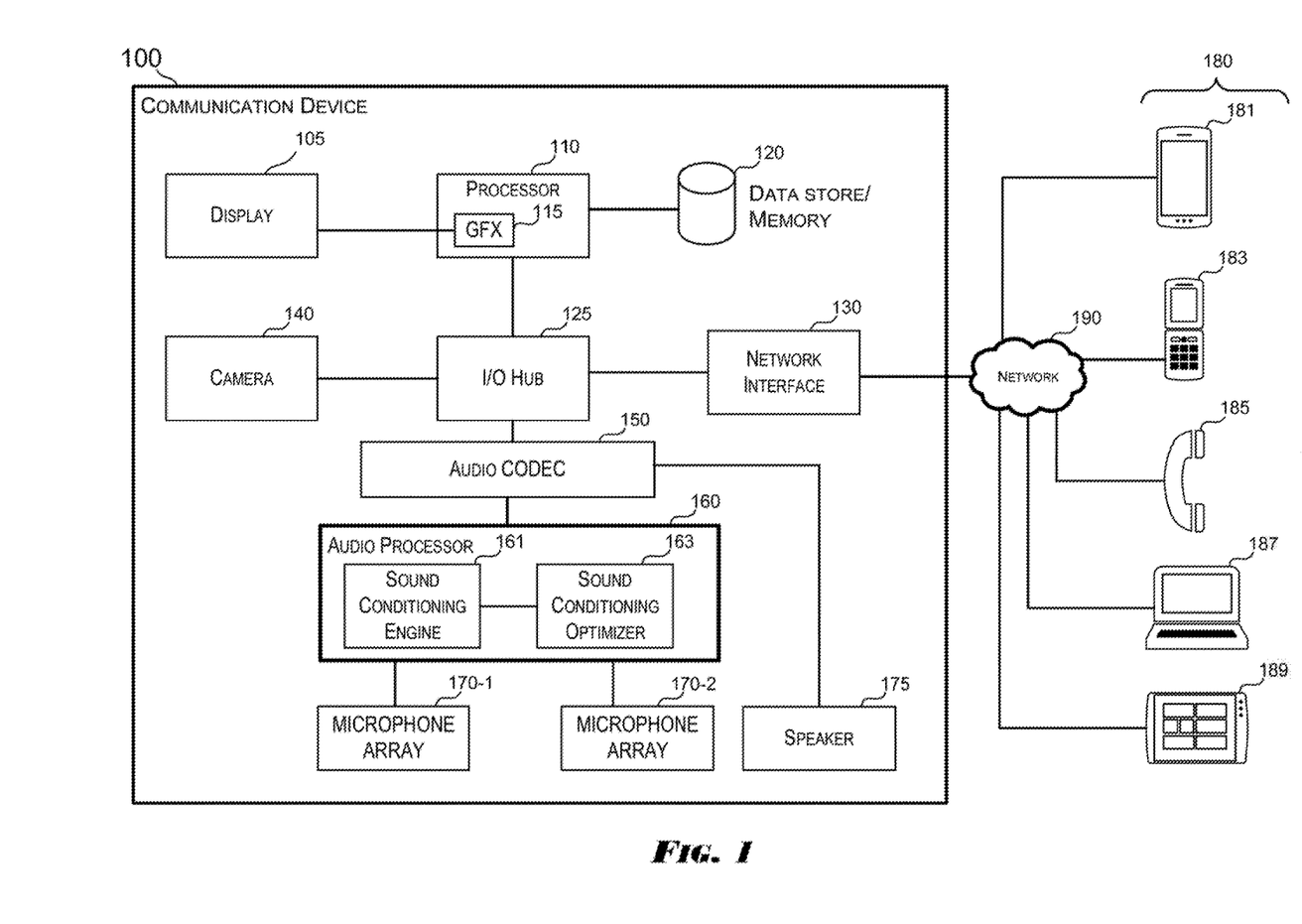
FIG. 1 is a schematic of a communication device that includes an audio processor with sound conditioning optimization functionality, according to various examples of the present disclosure.

FIG. 1 depicts a schematic of communication device 100 that can be used to communicate with one or more remote communication devices 180 through one or more communication networks 190. As described herein, communication device 100 can include any mobile or stationary computing device capable of detecting and processing sounds and generating and transmitting corresponding signals. For example, communication device 100 can include devices such as laptop computers, desktop computers, tablet computers, smart phones, voice over IP (VoIP) telephones, videophones, smart televisions, and the like.

Network 190 can include any wired or wireless electronic communication media and/or protocol suitable for transporting signals from communication device 100 to remote communication devices 180. For example, network 190 can include a local area network (LAN), a wireless local area network (WLAN), a worldwide interoperability for microwave access (WiMAX) network, an Ethernet, the Internet, a PSTN, and the like. Accordingly, remote communication devices 180 can include any suitable electronic communication device capable of sending and receiving electronic communication signals through network 190. Such remote communication devices 180 can include, but are not limited to, smart phones 181, mobile phones 183, landline telephones 185, laptop/desktop computers 187, tablet computers 189, and the like.

As illustrated in FIG. 1, the communication device 100 may include a number of components. In a specific example shown, communication device 100 can include a processor 110 that can retrieve and store computer executable instructions in the data store/memory 120. The processor 110 can execute the instructions for implementing operating system functionality, as well as other functionality implemented as computer readable code in the data store/memory 120. For example, the processor 110 can execute various drivers, controllers, application programming interfaces (APIs) to facilitate control of and communication among the various components of the communication device 100. The data store/memory 120 represents any form of volatile or non-volatile computer readable medium, such as SRAM, DRAM, flash, hard drives, solid-state drives, and the like. In such example implementations, the functionality of various components of the communication device 100 can be implemented as processor 110 executing instructions stored in the data store/memory 120. As such, the functionality of each component of communication device 100 can be implemented as executable code or code segments.

In addition to the processor 110, the communication device 100 may also include a display device 105, such as a computer display, touchscreen display, LED display, or projector. The display device 105 can be communicatively coupled to the processor 110 and/or the graphics coprocessor 115 to receive electronic signals corresponding to visual representations or graphics generated by the functionality the various components of communication device 100. For example, the display 105 may be used by the processor 110 to display a graphical user interface (GUI) or other visual indicators resulting from the execution of an operating system or other application.

Communication device 100 can include an input/output hub 125 for communicating with and controlling other components. For example, as shown, the processor 110 can control a camera 140 and send signals using network interface 130 through the input/output hub 125. In addition, the processor 110 can be coupled to an audio codec 150 through the input/output hub 125.

The audio codec 150 can include functionality for encoding and decoding audio signals. In one example, the audio codec 150 can be coupled to an audio processor 160 to convert audio signals into one or more electronic formats usable by the processor 110 or some other component of the communication device 100. In such examples, the audio processor 160 can generate audio signals in response to sound signals received from the microphone arrays 170. The sound signals received from the microphone arrays 170 can correspond to sounds detected by the microphone arrays 170. Accordingly, the audio processor 160 can apply various processing functionality to modify or improve the quality of the resulting audio signals before they are encoded and used in communication with a remote communication device 180. For example, audio processor 160 can include functionality of a sound conditioning engine 161 to apply various noise and/or echo cancellation operations on the sound signals received from the microphone arrays 170. Such functionality of the audio processor 160 can Increase the clarity of voices or other desired sounds that are ultimately transmitted to remote communication devices 180.

In various implementations, the specific type of noise and/or echo cancellation operations applied to the sound signals by the sound conditioning engine 161 can be specific to the type, configuration, and/or mode of operation of the microphone array 170. Accordingly, the sound conditioning engine 161 may be most effective when a user, or other sound source, is physically located within a zone of optimal sensitivity associated with the specific microphone array 170. As shown, the communication device 100 can include multiple microphone arrays, 170-1 and 170-2, such that the sound conditioning engine 161 can apply different sound conditioning operations to the sound signals depending on the source microphone array 170.

In various examples, audio processor 160 can also include the functionality of the sound conditioning optimizer 163. The sound conditioning optimizer 163 can evaluate the conditioned sound signals generated by the sound conditioning engine 161 to determine the quality or efficacy of the applied sound conditioning. If the quality or the efficacy of the sound conditioning is degraded, the sound conditioning optimizer 163 can generate a user feedback message.

The user feedback message can include instructions that the processor 110 can execute to generate visual or audio indications of user position changes to guide the users to the optimal sound conditioning region associated with the particular microphone array 170 and/sound conditioning being used. For example, the user feedback message can include instructions for the user to move closer to or farther from the microphone array 170. Similarly, the feedback message can also include instructions for the user to move to the left, to the right, up, or down relative to microphone array 170 until the source of the sound, such as the user's mouth, is within the optimal zone. In such examples, the feedback message can include instructions for the processor 110 to generate visual indicators, such as arrows or flashing lights on the display 105 that would guide the user to place the sound source in the optimal physical region for the specific microphone array 170. Similarly, the feedback message can include instructions for the processor 110 to generate audio tones using speaker 175 to guide the user. In such implementations, the audio tones can include recorded or synthesized spoken language to issue instructions, such as "move forward", "move back", "move to the left", "move to the right", and the like, to direct the user back to the optimal zone relative to the microphone array 170.

Figure 2:
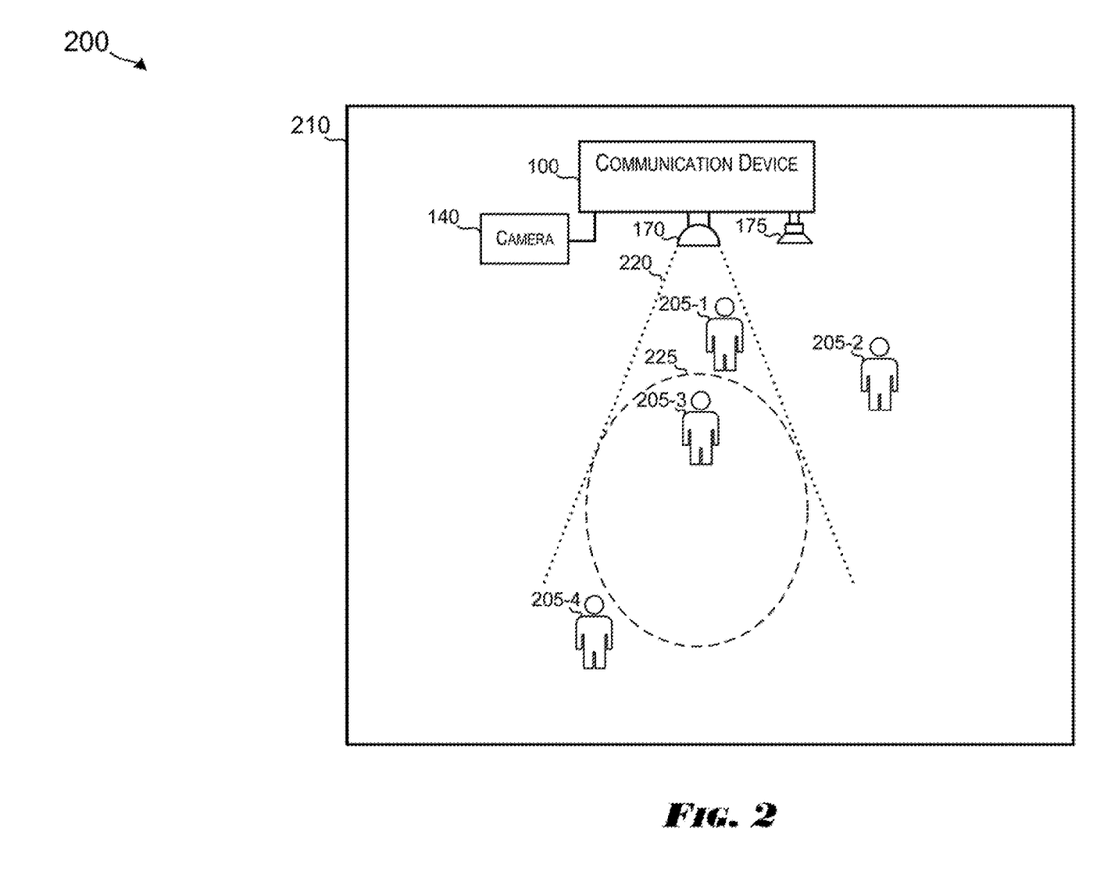
FIG. 2 depicts an optimal sound conditioning region of a microphone array in a communication device, according to an example of the present disclosure.

FIG. 2 illustrates a scenario 200 in which a communication device 100 is disposed in a particular environment 210. For the sake of clarity and brevity, environment 210 is referred to herein as a room 210. However, environment 210 may include any type of open or closed location, such as outdoor locations, the interior of an automobile, a conference room, a house, an office, and the like. In the example shown, the communication device 100 is disposed in a particular location within the room 210. During operation (e.g., while a teleconference or videoconference is in session), the communication device 100 can detect local sounds from one or more users 205 using microphone array 170 for transmission to one or more other remote devices (not shown). As described herein, the microphone array 170 may have an optimal sensitivity region based on the physical and electronic configuration and/or mode operation of its internal microphones. The optimal sensitivity region of the microphone array 170 is illustrated in FIG. 2 as region 220. Region 220 is illustrated as extending generally forward away from microphone array 170. However, in other implementations, the microphone array 170 may be configured or operated to change the direction, shape, and arrangement of optimal sensitivity region 220.

To further improve the sound quality of voices or other sounds detected by the microphone array 170, while not explicitly depicted in FIG. 2, communication device 100 can also include functionality described in reference to audio processor 160, sound conditioning engine 161, and sound conditioning optimizer 162, as described herein. In such implementations, the microphone array 170 can detect sounds in the room 210 and generate corresponding sound signals. Such sound signals can include electrical signals that may include modulated voltages and/or currents. The audio processor 160 can apply various filters to the sound signals provided by the microphone array 170 to select or reject certain aspects of the sound signals. The process of filtering or altering the sound signals to improve or otherwise change the quality the sound signals is referred to herein as "sound conditioning".

Sound conditioning engine 161 can apply one or more filtering techniques to isolate or improve the fidelity of user utterances detected by the microphone array 170. As used herein, the term "utterance" can refer to any sound or vocalization produced by a user. Such filtering techniques can include digital and/or analog filters that process sound signals based on frequency, amplitude, power, and the like. In various implementations according to the present disclosure, the filtering techniques can include noise cancellation to separate the desired sounds (e.g., utterances from a particular user, sounds of a musical instrument, etc.) from background sounds/noise (e.g., traffic, HVAC fans, ambient conversation, etc.). In other implementations, the filtering techniques can include echo cancellation that can separate the desired sounds from echoes caused by to configuration of the room 210, communication device 100, and other environmental factors. Noise cancellation and echo cancellation are both useful for isolating the sounds corresponding to the voice a particular user 205 or other target sound source.

Some sound signals generated by the microphone array 170 may be better suited for specific sound conditioning techniques. For example, if the amplitude of signals corresponding to a desired voice of a user in a sound signal is too small (e.g., too quiet) or too large (e.g., too loud), a particular sound conditioning functionality may perform sub optimally or inadequately. Changes in the sound signals that include or correspond to the sound of a user 205, can vary with location of a particular user 205 relative to the microphone array 170 and/or the corresponding optimal sensitivity region 220. For example, utterances spoken by user 205-1 close to microphone array 170 and utterances spoken by user 205-4 farther from the microphone array 170, may originate from a location within the optimal sensitivity region 220, however, corresponding the resulting sound signals may be less effectively or sub optimally processed by the sound conditioning engine 161. Similarly, sound signals corresponding to utterances from a user 205-2 located outside of the optimal sensitivity region 220 may also be ill-suited for effective sound conditioning (e.g., noise cancellation and/or echo cancellation) techniques applied by the sound conditioning engine 161. In contrast, the communication device 100, and/or the sound conditioning engine 161, may include sound conditioning functionality that will perform optimally on sound signals corresponding to utterances detected from users located in an optimal sound conditioning zone 225 within the region 220. Accordingly, for the sound signals corresponding to utterances spoken by users 205-1, 205-2, and/or 205-4 to be optimally conditioned, users 205-1, 205-2, and/or 205-4 would need to move to the optimal sound conditioning zone 225. Examples of the present disclosure may include functionality, described in reference to the sound conditioning optimizer 163, to provide feedback that guides users 205 or other sounds source to move into the optimal sound conditioning zone 225 within the room 210.

Figure 3:
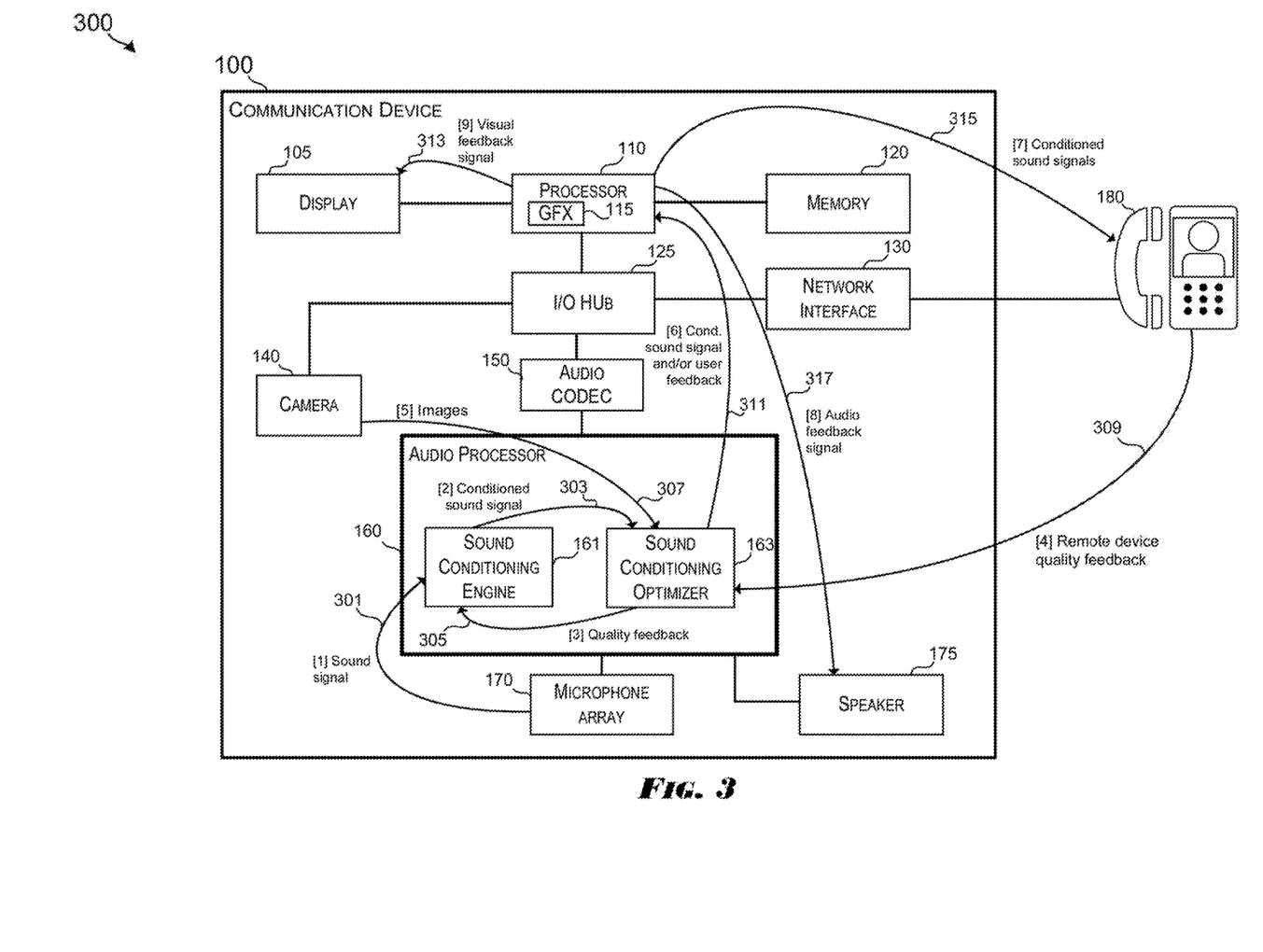
FIG. 3 depicts an information flow in a system for optimizing sound conditioning in a communication device according to an example of the present disclosure.

FIG. 3 illustrates information flow 300 according to an example implementation of the present disclosure. When microphone array 170 is active, as when the communication device 100 has initiated a communication session with a remote communication device 160 (e.g. a video telephone), it can provide sound signals at 301 to the sound conditioning engine 161 (reference 1). In some examples, the sound signals at 301 can include raw and/or filtered sound signals that correspond to sounds detected by the microphone array 170. The sound conditioning engine 161 can condition the sound signals to generate conditioned sound signals at 303 (reference 2). As described herein, the conditioned sound signals 303 may include altered versions of the sound signals 301 resulting from the application of various signal processing filters, such as noise cancellation, echo cancellation, and the like.

Once the conditioned sound signals 303 are generated, they can be provided to the sound conditioning optimizer 163. The sound conditioning optimizer 163 may evaluate the conditioned sound signals 303 to determine the quality of the conditioned sound signals. In one example, evaluating the conditioned sound signals 303 may include determining the efficacy with which the sound conditioning engine 161 separated the sound of utterances of users, or other target sounds, from other undesirable sounds. Accordingly, the evaluation of the conditioned sound signals 303 may include measuring the signal-to-noise ratio. In one particular implementation, the sound conditioning optimizer 163 may compare the signal-to-noise ratio, or other measure of the quality, of the conditioned sound signal 303 to a predetermined or dynamically determined threshold value.

If the signal-to-noise ratio of the conditioned sound signal 303 determined to be above the threshold, then the sound conditioning optimizer 163 can send the conditioned sound signals to the processor 110. In FIG. 3, the conditioned sound signals at 311 are shown as being sent along with user feedback signal. However, in scenarios in which the conditioned sound signals are determined to have sufficient quality or are otherwise optimal, the conditioned sound signals (reference 6) can be sent processor 110 independently. Processor 110 can then send the conditioned sound signals to one or more remote communication device 180 at 315 (reference 7) through network interface 130.

In scenarios in which the sound conditioning optimizer 163 determines that the quality of the conditioned sound signals 303 is below a certain threshold or has become degraded during the communication session, it can generate a quality feedback signal at 305 (reference 3). In such example implementations, the sound conditioning optimizer 163 can indicate to the sound conditioning engine 161 by the quality feedback signal 305 that it should adjust the current sound conditioning, functionality or apply a different sound conditioning technique. Accordingly, in response to the quality feedback signal 305, the sound conditioning engine 161 can change the noise cancellation and/or echo cancellation filter applied to the incoming sound signals 301. The process can be repeated during the communication session by sound conditioning engine 161 sending newly conditioned sound signals 303 back to the sound conditioning optimizer 163 for evaluation. Accordingly, the sound conditioning engine 161 and the sound conditioning optimizer 163 can operate in real or near real time during a communication session to attempt to correct for sub optimally conditioned sound signals.

In the event that the conditioned sound signals 303 are acceptable, then, as described above, the conditioned sound signals 315 can be forwarded to the receiving remote communication devices 180. However, if the sound conditioning engine 161 changes or tunes the sound conditioning functionality and the conditioned sound signals 303 are still unacceptable, the sound conditioning optimizer 163 can determine a correction to the user positioning relative to the microphone array 170 that might improve the quality of the conditioned sound signals 303. The determined correction can be used to generate a user feedback message that can accompany, in parallel or in series, the currently conditioned sound signals 311 (reference 6) sent to the processor 110. The user feedback message may include instructions the processor 110 can execute to generate instructions to guide the user 205 to an optimal sound conditioning region 225 associated with the corresponding microphone array 170 and/or sound conditioning technique. Such instructions may include directions for the user 205 to move closer to or farther from the microphone array 170 and/or the region of optimum sensitivity 220.

Processor 110 can process the user feedback message, to generate control signals for providing visual or audio feedback to the user 205. For example, the processor 110, according to the user feedback message at 311, can generate audio feedback signals at 317 (reference 8) for speaker 175 to produce audio tones that can guide a user 205 back to the optimal sound conditioning region 225. For example, the audio tones can include recorded or synthesized voice commands that instruct the user 205 to change location until he or she is in the correct position relative to the optimal sound conditioning region 225 for the microphone array 170.

In other example implementations, the processor 110 can generate visual feedback signals 313 (reference 9) based on the user feedback message 311. In such examples, the processor 110, and/or graphics processor 115, can generate a visual indication that can be shown to the user 205 to guide them back to the optimal sound conditioning region 225. In some examples, the visual indication may include a graphical user interface (GUI) with arrows or other directional indicators corresponding to the user location change necessary to return to region 225. The arrows or other directional indicators can remain displayed and/or illuminated until the user 205 is in the correct location relative to the microphone 170. In yet other examples, the visual feedback signals 313 to cause the display 105 to display a previously captured or real time video image of the room 210 generated by the camera 140 (e.g., an image captured during a video conference). The processor 110 or graphics processor 115, can render a GUI superimposed over the image of the room 210. The GUI can include visual indicators of the location of the region 225 (e.g., an outline around the area of the room 210 that is in the region 225, or some other emphasis of that region), so that the user 205 may move to the corresponding region of the room 210. For example, the real-time image of the room 210 may include an image of the user 205 that shows the user 205 as being inside or outside the optimal sound conditioning region 225.

In another example, visual directional indicators, such as arrows, can be superimposed over the image of the room 210 to indicate in which direction the user 205 should move to return to the optimal sound conditioning region 225. When the sound conditioning optimizer 163 evaluates the conditioned sound signals 303 resulting from the sound signal 301 corresponding to the user 205 speaking to have acceptable quality, it can change the user feedback message 311 so that the processor 110 can cease to display the visual indicators on display 105.

The location of the optimal sound conditioning region 225 may be predetermined based on tests or calibrations performed with the communication device 100 and/or the microphone array 170 in a particular room 210. The threshold quality of the conditioned sound signals 303 evaluated by the sound conditioning optimizer 163 may correspond to the test results. However, the resulting conditioned sound signals 315 sent to the remote communication device 180 may be sub optimal for the remote sound reproduction system. To account for the capabilities of the remote communication device 180, example implementations of the present disclosure may include functionality in the sound conditioning optimizer 163 for receiving remote device quality feedback signal 309 (reference 4). In response to the remote device feedback message 309, the sound conditioning optimizer 163 may generate corresponding user feedback messages at 311 to further direct a user 205 closer to the center of a previously determined optimal sound conditioning region 225 or a new region with which the previously determine optimal sound conditioning region 225 may or may not overlap. Using the remote device quality feedback signal 309, the sound conditioning optimizer 163 can further refine the optimal sound conditioning region 225 so that the best possible conditioned sound signals 315 can be produced based on the characteristics of the microphone array 170, the sound conditioning functionality of the sound conditioning engine 161 and the sound reproduction capabilities of the remote communication device 180.

Figure 4:
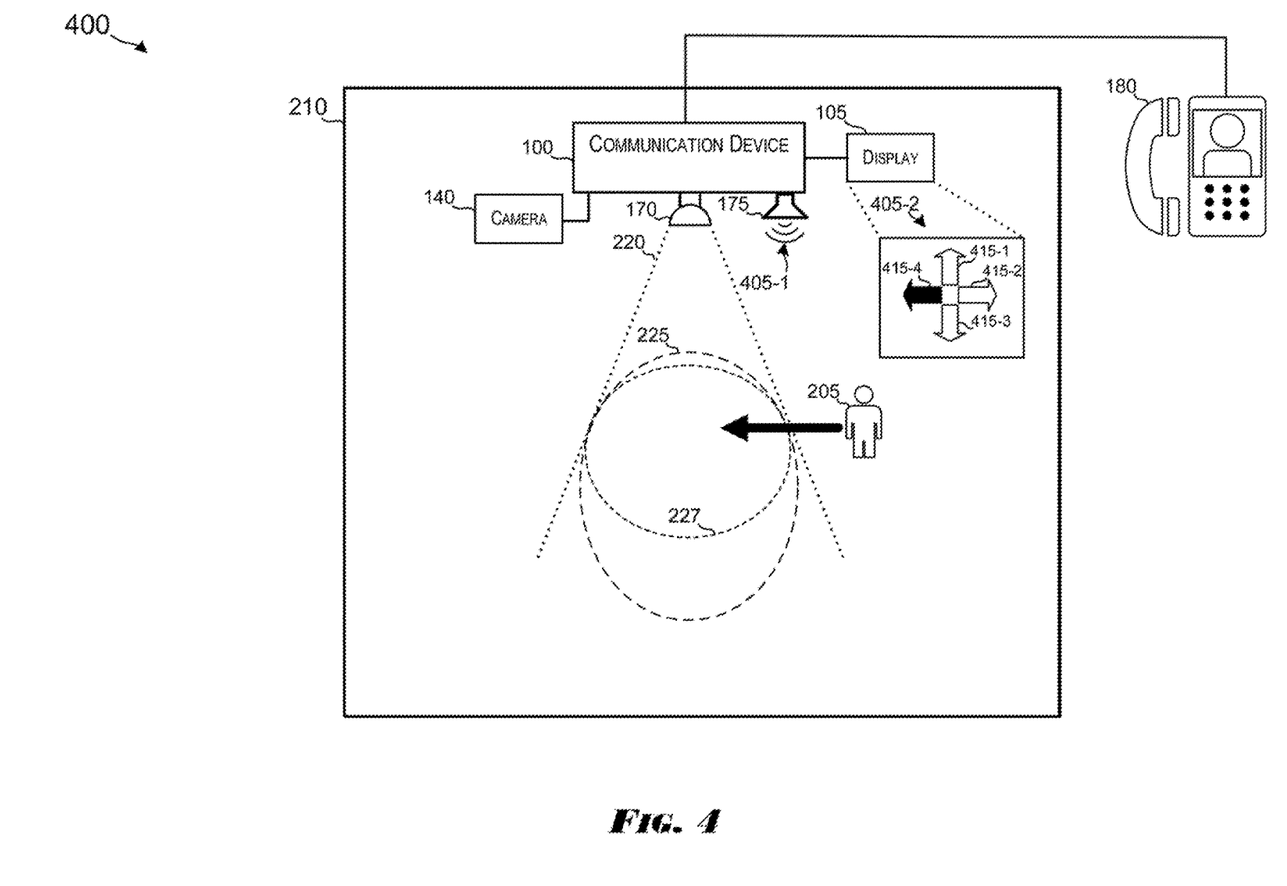
FIG. 4 illustrates feedback messages for indicating user location changes, according to examples of the present disclosure.

FIG. 4 illustrates various features and elements described above in reference to FIGS. 1 through 3. For example, display 105 of the communication device 100 is illustrated of displaying a user feedback message 405-2 with visual indicators 415. In this particular example shown, the visual indicators of 415 include a number of arrows which the user 205 can use to guide himself back into the optimal sound conditioning region 225. Similarly, speaker 175 is illustrated as emitting audio feedback message 405-1 that may include audio tones to guide the user 205 back to the optimal sound conditioning region 225. As described herein, the audio tones of the audio feedback message 405-1 can include voice commands or other sounds that indicate the direction that the user 205 should move in order to remain in or return to the optimal sound conditioning region 225.

Also illustrated in FIG. 4, is the refinement of the optimal sound conditioning region 225 based on quality feedback signals 305 and remote device quality feedback signals 309. The sound conditioning optimizer 163 can redefine the optimal sound conditioning region 225 to an updated or corrected optimal sound conditioning region 227. While the corrected optimal sound conditioning region 227 is shown as being contained within the previous optimal sound conditioning region 225, in various examples of the present disclosure, the corrected region 227 may or may not overlap with or be contained in the original region 225.

Various examples the present disclosure include functionality described in reference to the sound conditioning optimizer 163. The sound conditioning optimizer 163 can be implemented as any combination of hardware and software. For the sake of clarity, the sound conditioning optimizer 163 has been described as component of the audio processor 160 of the communication device 100. However, the sound conditioning optimizer 163 may also be implemented as a standalone application implemented as one or more types of computer executable code executable by the processor 110 to support functionality of an external application or operating system. Accordingly, the sound conditioning optimizer 163 may be executed on a general purpose computing device, such as a desktop computer, laptop computer, tablet computer, smart phone, smart television, and the like. To further illustrate some of the functionality of the sound conditioning optimizer 163, FIG. 4 is a flowchart of an example method 500 comparable to the functionality of the sound conditioning optimizer 163.

Figure 5:
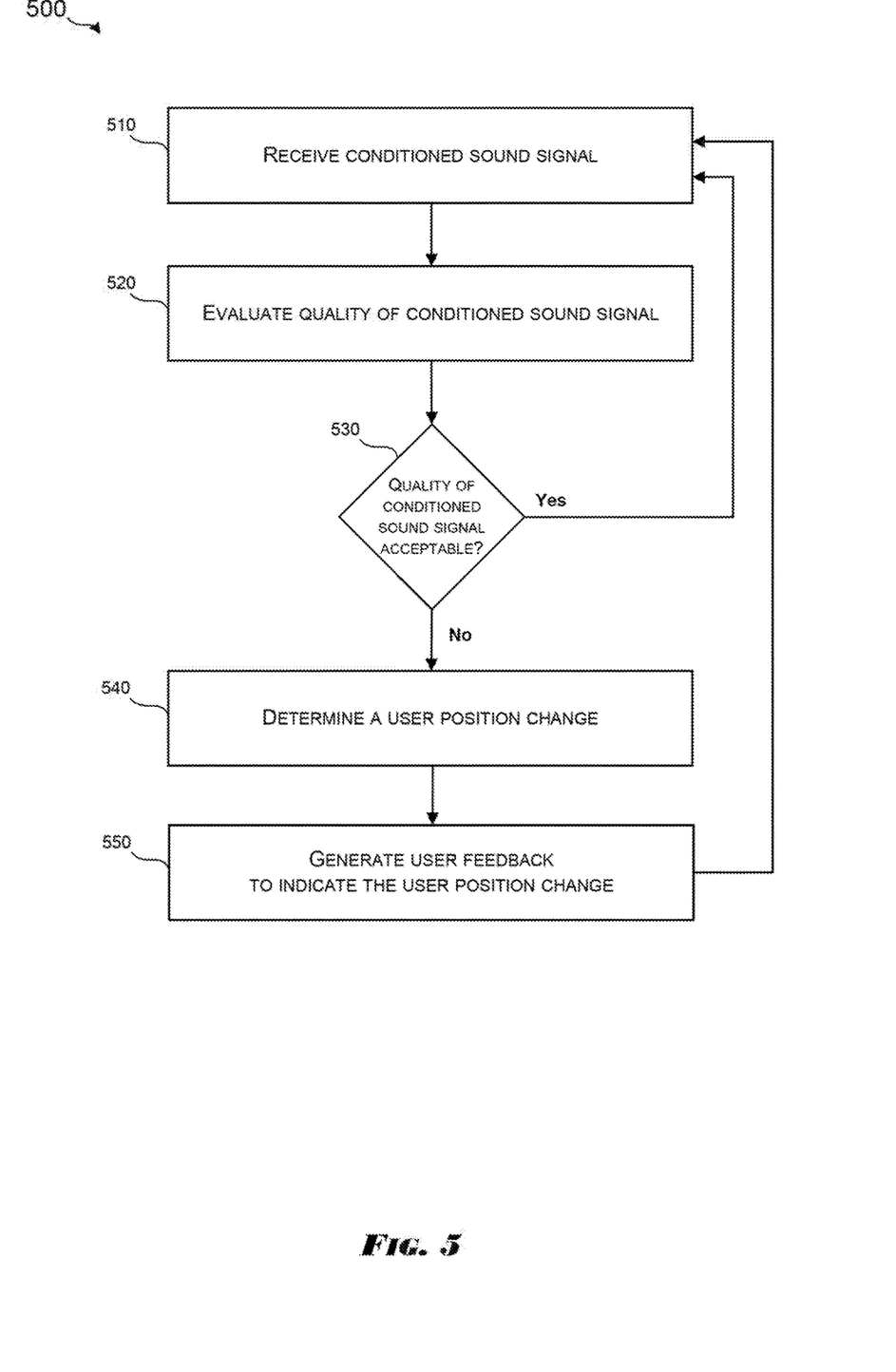
FIG. 5 is a flowchart of a method for optimizing sound conditioning, according to examples of the present disclosure.

As shown in FIG. 5, the method 500 can begin at box 510 in which the sound conditioning optimizer 163 can receive a conditioned sound signal. The conditioned sound signal can be the result of noise cancellation, echo cancellation, and other audio filters applied to raw or unprocessed sound signals generated by a microphone array 170 in response to external stimulus or audio input, such as detected local sounds. At box 520, the sound conditioning optimizer 163 can evaluate the quality of the conditioned sound signals. The evaluation of the quality of conditioned sound signals can include any measure or metric by which the quality can be judged. In some examples, the quality of the conditioned sound signals can be represented by a numerical metric, such as a signal-to-noise ratio. Accordingly, evaluation of the quality of the conditioned sound signals can include a comparison of the numeric metric with a threshold value. The threshold value of the quality of the conditioned sound signals can correspond to a region defined relative to a room 210 and/or a microphone array 170.

The sound conditioning engine 161 can map its sound conditioning capabilities (e.g., quality of sound condition scores) to locations in the room 210. For example, the sound conditioning engine 161 can determine that sounds detected in the particular locations of a room may be conditioned to a certain quality. The quality of the conditioned sound signal may be determined to be acceptable or unacceptable based on objective or subjective criteria. Locations that result in unacceptable conditioned sound signals can be defined as outside of the optimal sound conditioning region. Locations that result in acceptable condition sound signals can be defined as in the optimal sound conditioning region.

The criteria by which the conditioned sound signals are evaluated can be based solely on the judgment of a user 205 that the conditioned sound signals result in audio tones in a particular type of remote communication device 180 that clearly and intelligibly represent the meaning of a user's utterances. In other examples, the criteria can be more objective. For example, the amplitude, also referred to as the volume, of the resulting audio tones may be defined acceptable only if it is within a particular range (e.g., range of normal human hearing).

In examples in which the sound conditioning optimizer 163 evaluates the quality of the conditioned sound signals, it can then determine whether the quality of the conditioned sound signal is acceptable, at determination 530. If the quality is acceptable, then the sound conditioning optimizer 163 can continue to receive and monitor the conditioned sound signals, and processes of 510 through 530 can be repeated. If, however, the sound conditioning optimizer 163 determines that the quality of the conditioned sound signal is unacceptable at determination 530, then the sound conditioning optimizer 163 can determine a user position change at 540. Determining a user position change can include analyzing the metric or metrics used by the sound conditioning optimizer 163 to characterize the quality of the conditioned sound signal. The sound conditioning optimizer 163 may include or have access to information that indicates or maps the correlation of the quality of the conditioned sound signals to locations in the room relative to the microphone array 170 and/or the optimal sound conditioning region 225. Using such information, the sound conditioning optimizer 163 can determine how the user 205 should change position to move closer to region 225 (or corrected region 227).

At 550, the sound conditioning optimizer 163 can generate a user feedback message to indicate the user position change. In various examples, the user feedback message can be used by the communication device 100, or some component thereof, to generate a feedback signal. The feedback signal can be converted into an audio or visual feedback signal usable to generate a visual indicator or audio indicator to guide the user 205 to the optimal sound conditioning region 225.

In various example implementations according to the present disclosure, the sound conditioning engine 161 and sound conditioning optimizer 163 can be implemented as components of a communication device 100. Accordingly the functionality of the sound conditioning optimizer 163 can be included in one or more other components of the communication device 100. For example, as illustrated, the sound conditioning engine 161 and the sound conditioning optimizer 163 can be included in the audio processor 160. However, the functionality of the sound conditioning engine 161 and/or the sound conditioning optimizer 163 can be implemented as a combination of hardware and software (e.g. applications executed on the processor 110). Alternatively, the functionality of the audio processor 160, the sound conditioning engine 161, and/or the sound conditioning optimizer 163 can be implemented in one or more application-specific integrated circuits (ASICs).

Figure 6:
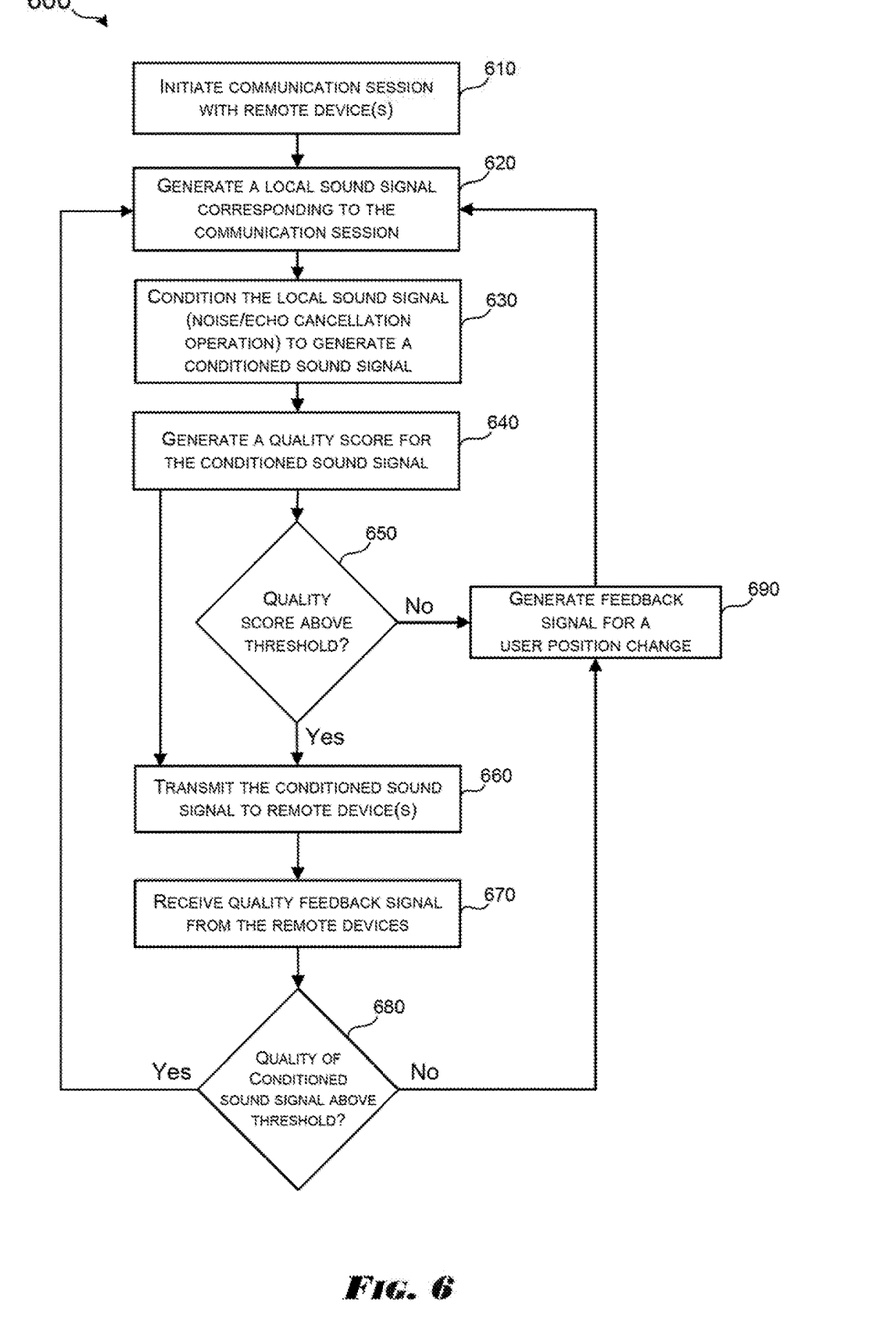
FIG. 6 is a flowchart of a method for operating a communication device with sound conditioning optimization functionality, according to examples of the present disclosure.

FIG. 6 is a flowchart of a method 600 for operating the communication device 100 that includes sound conditioning optimization functionality, according to the present disclosure. Method 600 can begin at 610 in which the communication device initiates a communication session with one or more remote communication devices. For example, the communication device 100 can initiate or participate in a teleconference or a video conference using various electronic communication protocols and media.

At 620, the communication device 100 can let generate a local sound signal corresponding to the communication session. For example, the communication device 100 can detect utterances of a user(s) 205 detected during the conversation of the communication session using a microphone array 170. The microphone array 170 can generate raw and/or processed sound signals that corresponds to the utterances of the local user 205.

At 630, the communication device can condition the local sound signals to generate a conditioned sound signal. The conditioned sound can result from the application of various operations or filters (e.g. noise/echo cancellation operations) on the local sound signals. The conditioned sound signals are intended to be used to generate corresponding audio tones that reproduce the sound detected by the microphone array 170 with sufficient quality and clarity so as to be intelligible and otherwise easily understood by remote users participating in the communication session using the remote communication devices 180.

The communication device 100 can generate a quality score for the conditioned sound signals at 640. As described herein, the quality of the conditioned sound signals can be based on the effectiveness of the sound conditioning applied to the local sound signals to separate desired sounds from undesirable sounds. For example, the quality score can correspond to the clarity with which a user may be able to discern the voice of a speaker relative to ambient or background noise. If at determination 650, the communication device 100 determines that the quality score for the conditioned sound signal is above a threshold value, then the conditioned sound signals may be transmitted to a remote communication device, at 660. However, if at determination

650, the communication device 100 determines that the quality score is below the predetermined quality threshold, then the communication device 100 can generate a feedback signal corresponding to a user position change.

The feedback signal may include instructions that can be used to generate audio or visual indicators for guiding the user to a position relative to the microphone array 170 and/or the communication device 100 in which the applied sound conditioning might be more effective in producing an acceptable conditioned sound signal quality. In such examples, the communication device 100 can monitor the quality of the conditioned sound signal being transmitted to the remote devices at 660 in real or near real time so as to provide the user guidance for improving the quality of the transmitted audio during the active communication session. Accordingly, examples of the present disclosure advantageously allow users to make corrections to their position to ensure the best possible audio quality for the other participants of the communication session.

In scenarios in which the conditioned sound signals are of sufficient quality, the communication device 100 may transmit the conditioned sound signals to the remote communication devices without generating a local feedback signal, at 660. At 670, in response to the conditioned sound signal, the communication device 100 may receive a quality feedback signal from the remote communication devices 180 indicating an evaluation of the quality of the transmitted conditioned sound signals.

At determination 680, communication device 100 can determine whether the quality feedback signal from the remote devices indicates that the quality of the conditioned sound signals is above a threshold. If the remote quality feedback signal indicates that the quality is acceptable, and the communication device can continue to generate local sound signals corresponding to the communication session and repeat actions 620-640 until the remote quality feedback signal indicates the quality of the conditioned data signal is below the threshold. In such scenarios, the communication device 100 can generate a feedback signal corresponding to a user position change as described above. Actions 610 through 690 can be repeated for as long as the communication session is active.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

What is claimed is:

1. A communication device comprising:
   a microphone array to detect sounds and to generate sound signals corresponding to the sounds, wherein the sounds comprise utterances of a user and other sounds;
   an audio processor coupled to the microphone array to perform sound conditioning on the sound signals to separate the utterances of the user from the other sounds to generate conditioned sound signals; and
   a display device coupled to the audio processor,
   wherein the audio processor:
      monitors a quality of the conditioned sound signals,
      detects that the quality of the conditioned sound signals has fallen below a threshold, and
      generates, in response to detecting that the quality of the conditioned sound signals has fallen below the threshold, user feedback signals that instruct the user how to move relative to the microphone array to position the user in a location within a region of optimal sensitivity of the microphone array for detecting the sounds,
   wherein the quality of the sound conditioning by the audio processor is optimized when the user is speaking the utterances while positioned within the region of optimal sensitivity of the microphone array, and
   wherein the display device generates visual indicators corresponding to the user feedback signals that instruct the user how to move relative to the microphone array.

2. The communication device of claim 1, further comprising a speaker coupled to the audio processor to generate audio tones corresponding to the user feedback signals that instruct the user how to move relative to the microphone array.

3. The communication device of claim 2, wherein the audio tones comprise spoken language instructions.

4. The communication device of claim 1, further comprising a camera to capture an image of an environment in which the communication device is disposed, and
   wherein the visual indicator includes the image of the environment and directional indicators superimposed on the image that instruct the user how to move relative to the microphone array.

5. The communication device of claim 1, wherein the other sounds comprise noise or echoes, and the quality of the sound conditioning comprises a measure of the separation of the utterances from the noise or the echoes in the conditioned sound signals.

6. The communication device of claim 1, further comprising a network interface coupled to the audio processor to transmit the conditioned sound signals to a remote communication device through a corresponding communication network, and wherein to generate the user feedback signals the audio processor receives a remote feedback signal from the remote communication device comprising an indication of a measure of the separation of the utterances from the other sounds.

7. The communication device of claim 1, wherein the user feedback signals guide the user to an optimal sound conditioning zone within the region of optimal sensitivity of the microphone array.

8. The communication device of claim 7, wherein the user feedback signals instruct the user of a direction the user is to move to remain in or return to the optimal sound conditioning zone within the region of optimal sensitivity of the microphone array.

9. The communication device of claim 1, wherein the user feedback signals instruct the user to move closer to or farther from the microphone array.

10. The communication device of claim 1, wherein the user feedback signals instruct the user to move left, right, up or down relative to the microphone array.

11. A non-transitory storage medium comprising instructions executable by a processor of a computing device coupled to a microphone array and a display device, the instructions executable to:
   receive a conditioned sound signal, wherein the conditioned sound signal includes utterances of a user separated from other sounds as captured by the microphone array;
   evaluate a quality of the conditioned sound signal;
   determine that the quality of the conditioned sound signal has degraded below a threshold;

generate a user feedback signal that includes instructions to the user to position the user in a location within a region of optimal sensitivity for detecting sounds with the microphone array;

optimize the quality of the conditioned sound signal to correct the degraded conditioned sound signal, wherein the quality of the conditioned sound signal is optimized when the user is speaking the utterances while the user is positioned within the region of optimal sensitivity of the microphone array and the degraded conditioned sound signal is corrected to a level above the threshold; and generate, on the display device, visual indicators corresponding to the user feedback signal that instruct the user how to move relative to the microphone array.

12. The storage medium of claim 11, wherein the instructions of the user feedback signal instruct the user of a direction to move to remain in or return to an optimal sound conditioning zone within the region of optimal sensitivity for detecting sounds with the microphone array.

13. The storage medium of claim 11, wherein the instructions of the user feedback signal instruct the user of a direction to move relative to the microphone array by displaying an arrow or flashing lights on the display device.

14. The storage medium of claim 11, wherein the instructions of the user feedback signal include directional indicators that instruct the user how to move relative to the microphone array superimposed on an image of an environment in which the microphone array is located as captured by a camera coupled to the computing device.

15. A processor-implemented method of optimizing sound conditioning in a communication device coupled to a microphone array and a display device, the method comprising:

generating, at the microphone array, a local sound signal corresponding to utterances of a user and other sounds detected by the microphone array;

conditioning the local sound signal to separate the utterances of the user from the other sounds to generate a conditioned sound signal;

evaluating the conditioned sound signal to generate a local quality score for the conditioned sound signal;

when the local quality score of the conditioned sound signal is below a threshold associated with the communication device, generating a local feedback message instructing the user of a direction the user is to move relative to the microphone array for positioning the user in a location within a region of optimal sensitivity for detecting sounds by the microphone array such that the local quality score of the conditioned sound signal rises above the threshold; and generating, on the display device, visual indicators corresponding to the local feedback message that instruct the user of the direction the user is to move relative to the microphone array.

16. The method of claim 15, further comprising:

transmitting the conditioned sound signal to a remote device;

receiving a remote quality feedback signal from the remote device in response to the conditioned sound signal; and when the remote quality feedback signal indicates the quality of the conditioned sound signal is below a threshold associated with the remote device, generating a secondary feedback message instructing the user of a secondary direction the user is to move relative to the microphone array such that the quality of the conditioned sound signal is above the threshold associated with the remote device.

17. The method of claim 11, wherein the local quality score is a measure of separation of the utterances from the other sounds in the conditioned sound signal.

18. The method of claim 15, wherein the local feedback message comprises instructions for the user to move in at least one direction relative to the microphone array superimposed on an image of an environment in which the communication device is located as captured by a camera coupled to the communication device.

19. The method of claim 15, wherein the local feedback message further includes an audio indication of the direction the user is to move relative to the microphone array.

20. The method of claim 15, wherein the local feedback message comprises instructions for guiding the user to an optimal sound conditioning zone within the region of optimal sensitivity for detecting sounds by the microphone array.

* * * * *

UNITED STATES PATENT AND TRADEMARK OFFICE
CERTIFICATE OF CORRECTION

PATENT NO. : 10,283,114 B2
APPLICATION NO. : 15/514640
DATED : May 7, 2019
INVENTOR(S) : Robert C Brooks et al.

Page 1 of 1

It is certified that error appears in the above-identified patent and that said Letters Patent is hereby corrected as shown below:

In the Claims

In Column 14, Line 26, Claim 17, delete "claim 11," and insert -- claim 15, --, therefor.

Signed and Sealed this
Twentieth Day of August, 2019

Andrei Iancu
*Director of the United States Patent and Trademark Office*